Patented Apr. 22, 1947

2,419,238

UNITED STATES PATENT OFFICE 2,419,238

BLOWN WRINKLE VARNISH

William A. Waldie, Oakwood, Ohio, assignor to New Wrinkle, Inc., Wilmington, Del., a corporation of Delaware No Drawing. Original application December 22, 1941, Serial No. 424,010, now Patent No. 2,373,212, dated April 10, 1945. Divided and this application January 6, 1944, Serial No. 517,232

2 Claims. (Cl. 260—19)

This invention relates to wrinkle varnish base, and this application is a division of my copending applications Serial No. 424,010, now Patent No. 2,373,212 filed December 22, 1941, as a continuation-in-part of application Serial No. 335,615, filed May 16, 1940, and of application Serial No. 463,443, filed October 26, 1942.

The primary purpose of this invention is the preparation of a wrinkle varnish base comprising the reaction product of drying oil, oil soluble resin and air at elevated temperature.

Hitherto the preparation of wrinkle varnish base has been considered to require the use of China-wood oil, oiticica oil and other similar drying oils containing conjugated double bonds, or mixtures of them. These oils or mixtures were generally used either in their raw or natural state or subsequent to preliminary treatment as by blowing, depending on the particular characteristics required in the finished wrinkle varnish base and the nature of the individual oil or mixture of oils being used.

More recently, as disclosed in copending application Serial No. 312,742, filed January 6, 1940, use has been made of blown dehydrated castor oil as a substitute for the costly drying oils previously used in the preparation of wrinkle varnish base.

I have discovered that a wrinkle varnish base can be produced by chemically combining unblown drying type oil with oil soluble resin and air at elevated temperature. The resulting product exhibits excellent wrinkling tendency with the addition of a small amount of drier in the usual manner, and the resulting composition produces a durable finish particularly characterized by its hardness and toughness.

As typical examples of formulations and procedures according to my invention, but without thereby limiting myself to the specific details of procedure and proportions indicated, the following illustrative examples are given:

Example I

| | | |
|---|---|---|
| Maleic acid resin | pounds | 100–125 |
| Dehydrated castor oil | gallons | 10–12 |
| Mineral spirit | do | 5–8 |
| Coal tar solvent | do | 1–2 |

In preparing the varnish base from the aforementioned components approximately one-half of the oil and all of the resin are placed in a kettle and heated rapidly to approximately 580° F. The balance of the oil is then added and the whole thoroughly mixed and removed from the fire. The mixture is allowed to cool to approximately 400° F. whereupon air is blown through it and the mixture kept at a temperature ranging between 375° and 400° F. The air blowing is continued for approximately one hour, and the blown mixture is then allowed to cool down to a temperature of approximately 300° F., whereupon the solvents are added.

The maleic acid resin may be of the type commercially available and sold under trade names such as Amberol 801, Beckacite 1110, Beckacite 1111 and Beckacite 1114, but, of course, other alkyd resins made from combinations of rosin, glycerine and polybasic acid or anhydride prove suitable.

Example II

| | | |
|---|---|---|
| Amberol 801 (maleic acid-rosin-glycerine resin) | pounds | 100 |
| Varnish grade linseed oil | gallons | 12 |
| Mineral spirit | do | 5 |
| Solvesso #2 | do | 16 |
| Nuodex cobalt 6% | do | ¾ |

In preparing the wrinkle varnish base from the above components, the resin is first melted in four gallons of oil by heating to a temperature of approximately 540° F. The balance of the oil is then added and the mixture heated to approximately 400° F. Air is then blown through the mixture to produce vigorous agitation and the temperature maintained within a range of from 375° to 400° F. until the desired viscosity is obtained. A satisfactory viscosity or end-point may be considered to have been reached when a drop falls from a stirring rod with a slight thread-like filament while hot. When this condition has been reached the mixture is withdrawn from the fire and the solvent and drier added thereto.

In this instance, the mineral spirit is that grade of petroleum product of either a paraffinic or naphthenic origin which is commonly known in the trade as turpentine substitute, while Solvesso #2 is a hydrogenated naphtha having a volatility similar to that of xylol and manufactured by Standard Oil Company. Nuodex cobalt 6% is a cobalt naphthenate drier solution in which the metallic cobalt amounts to about 6%.

The end-point for the blowing step may be determined as previously mentioned; however, it may also be determined by other means, as, for instance, by withdrawing test samples from time to time during the blowing operation, adding a predetermined amount of thinner to a definite weight of sample and comparing the viscosity of the resulting solution with the Gardner-Holdt viscosity standards.

Example III

| | | |
|---|---|---|
| Amberol F-7 | pounds | 100 |
| Castung Z-3 | gallons | 12 |
| Mineral spirit | do | 5 |
| Toluol | do | 24 |
| Nuodex cobalt 6% | do | ⅞ |

In preparing a wrinkle varnish base from the above components, the resin is melted in 8 gallons of the oil by heating to approximately 580° F. The mixture is then removed from the fire and the balance of the oil added to it and the whole then heated to approximately 400° F. The temperature is held between 375° and 400° F. and air blown through the mixture until the proper viscosity has been attained. The blown mixture is then removed from the fire and the mineral spirit added thereto. The thinned mixture is further diluted by adding the toluol as soon as the temperature has dropped to at least 300° F. at which time the cobalt drier is also added.

It will be noted that Amberol F–7 used in Example III is a rosin modified phenol-formaldehyde type of resin and, therefore, those skilled in the art will understand that other oil soluble and non-reactive phenol-aldehyde resins of the same general characteristics may be used in the practice of my invention. These include resins known by trade names such as Beckacite, Durez, Para-dura, Durite, Locto, Paranol, Varcum, etc. In every case an oil soluble and non-reactive quality must be employed.

The fundamental difference between the method of my invention and the product resulting from the practice thereof and the methods and products of the prior art resides in the fact that wrinkle varnish bases hitherto produced are characterized by the fact that they yield softer films at the same oil lengths than the wrinkle varnish base of my invention. Furthermore, the blown oils commonly used in the prior art exhibit auto-oxidizing tendencies due to the fact that they contain intermolecularly dispersed air which results in gradual and continuous oxidation and ultimately leads to separation of part of the oil as an insoluble gel thus rendering the product valueless for use in a varnish and particularly so when the varnish is part of a sprayable composition.

In contradistinction, the product of my invention will preserve its homogeneous nature and will show no separation for an indefinite period of time. I am unable to offer proof as to the mechanism of the reaction which the oil undergoes when treated with air at elevated temperature in the presence of the synthetic resin as hereinbefore set forth, but it is my opinion that due to the comparatively high temperature used in the blowing operation only that air which is chemically taken up by the mixture remains in the oil, the temperature of treatment being sufficiently high to expel any non-combined air, thereby preventing the intermolecular dispersion which appears to be present in the case of blown oils.

According to my invention, oil, as such, is not used in the preparation of the final wrinkle composition for it will be remembered that the oil and synthetic resin are conjointly aerated. In other words, the oil itself is not subjected to blowing but rather the combination of oil and synthetic resin, which appears to produce a new product which exhibits novel and valuable characteristics.

The selection of thinners is not critical although preference should be given to those products of high volatility such as toluol, xylol, light naphtha, etc. Of course, a small quantity of low volatile solvent may prove of value to bring about a sudden chilling of a batch in order to check the bodying thereof in the event that it should have been blown a trifle too long.

Likewise, many different driers may be used but preference should be given to those commonly known as "top driers" and which tend to form the surface skin which is so desirable in wrinkle compositions. The resinate, linoleate or naphthenate type of drier, characterized by ready solubility, proves very suitable for this purpose.

It will be understood that instead of the dehydrated castor oil and varnish grade linseed oil used in the examples tung oil, perilla oil, oiticica oil, soya bean oil, fish oil and other like oils having conjugated double bonds or mixtures thereof may be used, the choice depending primarily on the availability and cost. Those skilled in the art will understand that the Castung Z-3 used in Example III is a commercial grade of dehydrated castor oil.

The choice of resin will depend on the desired characteristics of the wrinkle varnish base. As has been noted hereinbefore, rosin modified alkyd resin such as maleic acid resin may be used satisfactorily and it will be understood that other polybasic acids or their anhydrides, including phthalic, tartaric, citric and malic may be substituted for the maleic acid or anhydride, although the rosin modified maleic acid resin is preferred from among the alkyd resins. Likewise, other phenol-aldehyde resins may be used in place of the Amberol and Durez resins hitherto mentioned.

Furthermore, natural resins such as congo, kauri, Batu, Zanzibar, oil soluble Manila, Pontianak, etc., may be employed but where such natural resins are used they should first be "run" to make them oil soluble and the first step of the process hereinbefore described would have to be altered accordingly. In such case, the resin would first be fused, the first portion of the oil added to it, and the temperature raised to a point sufficient to dissolve the resin in the oil, after which the second portion of the oil would be added and the whole then submitted to the blowing step. The necessity for pretreating the natural resin will be fully appreciated by those skilled in the art.

The products resulting from the practice of Examples II and III are adapted for use as clear wrinkle finishes without further treatment; however, the product of Example I does not include the required metallic drier and has a consistency greater than permissible for proper spraying. A suitable wrinkle coating composition could be prepared from the product of Example I as follows:

*Example IV*

| | Parts by volume |
|---|---|
| Wrinkle varnish base | 20 |
| Toluol | 9 |
| Cobalt drier | 1 |

The cobalt drier may be prepared as follows:

*Example V*

| | Gallons |
|---|---|
| Cobalt resinate, linoleate, or naphthenate | 10–15 |
| Toluol or xylol | 5– 8 |

Another type of drier suitable for use in Example IV may be prepared as follows:

*Example VI*

| | | |
|---|---|---|
| Cobalt linoleate solid | pounds | 12–16 |
| China wood oil fatty acids | do | 8–10 |
| Toluol, xylol, petroleum naphtha, etc. | gallons | 6– 8 |

It will be understood that metal driers other than cobalt compounds may be used, such as those of manganese. The inherent characteristic of the drier to be used is its ability to bring about a rapid formation of a skin on the exposed surface of the film in order to cause the changes in volume between the surface of the film and the interior thereof which lead to the production of a wrinkle surface.

The wrinkle coating compositions of Examples II, III and IV may be further compounded with pigment ground in oil vehicle for the purpose of producing wrinkling enamels, and texture modifying ingredients namely drying oil fatty acid solutions may be added thereto. Such pigments, namely titanium oxide, asbestine, silica, Silex, whiting, calcium carbonate, china clay, chrome green, blanc fixe, magnesium carbonate, and diatomaceous earth, and texture modifying ingredients, as well as other driers, namely manganese borate, which may be substituted for that used in the Examples, are broadly disclosed in my copending applications Serial Nos. 271,590, 271,591, and 271,592, filed May 3, 1939; Serial Nos. 297,162, 297,163, and 297,164, filed September 29, 1939; and Serial No. 421,769, filed December 5, 1941.

Wrinkle coating compositions such as that of Example IV produced using the wrinkle varnish base of my invention are adapted to be sprayed and then baked at temperatures of from 200° to 250° F. for approximately one hour to produce a wrinkle finish characterized by its toughness and hardness.

It will be understood that while I have set forth certain specific embodiments of my invention, it is not my intention to have my invention limited to or circumscribed by the specific details of procedure and proportions indicated in view of the fact that my invention is adapted to changes according to individual preference and conditions without departing from the scope thereof as defined in the appended claims.

I claim:

1. The method of making wrinkle varnish base which consists in heating unblown dehydrated castor oil and oil-soluble rosin-modified phenol-formaldehyde resin to approximately 580° F., discontinuing the heating, adding more unblown dehydrated castor oil and heating to approximately 400° F. and then holding the temperature at between 375 and 400° F. while blowing air through the mixture until a predetermined desired viscosity is obtained.

2. The method of making wrinkle varnish base which consists in heating approximately eight gallons of unblown dehydrated castor oil and one hundred pounds of oil-soluble rosin-modified phenol-formaldehyde resin to approximately 580° F., discontinuing the heating, adding approximately four gallons of unblown dehydrated castor oil, heating the mixture to approximately 400° F., and holding the temperature at from 375° to 400° F. while blowing air through the mixture until the desired viscosity has been attained.

WILLIAM A. WALDIE.

REFERENCES CITED

The following references are of record in the file of this patent:

UNITED STATES PATENTS

| Number | Name | Date |
| --- | --- | --- |
| 2,154,954 | Moore | Apr. 18, 1939 |
| 1,968,244 | Egge et al. | July 31, 1934 |
| 2,133,889 | Bonney et al. | Oct. 18, 1938 |
| 2,225,534 | Flint et al. | Dec. 17, 1940 |
| 2,279,499 | Seebach | Apr. 14, 1942 |
| 2,248,966 | Corkery | July 15, 1941 |
| 1,864,763 | Root | June 28, 1932 |